United States Patent [19]

Nakagawa et al.

[11] Patent Number: 5,651,123
[45] Date of Patent: Jul. 22, 1997

[54] PROGRAM EXECUTION CONTROL DEVICE HAVING ADDRESSABILITY IN ACCORDANCE WITH M SERIES PSEUDO-RANDOM NUMBER SEQUENCE

[75] Inventors: Shinichi Nakagawa; Kazuya Ishihara; Satoshi Kumaki; Atsuo Hanami; Hiroshi Segawa; Tetsuya Matsumura, all of Hyogo, Japan

[73] Assignee: Mitsubishi Denki Kabushiki Kaisha, Tokyo, Japan

[21] Appl. No.: 460,947

[22] Filed: Jun. 5, 1995

[30] Foreign Application Priority Data

Jul. 15, 1994 [JP] Japan .................................. 6-163480

[51] Int. Cl.$^6$ .................................................. G06F 9/30
[52] U.S. Cl. .................... 395/384; 395/381; 382/160; 371/22.4; 364/717.01; 365/240
[58] Field of Search .................... 395/375, 183.06, 395/381, 384; 382/160; 371/22.4; 364/717; 365/240

[56] References Cited

U.S. PATENT DOCUMENTS

| | | | |
|---|---|---|---|
| 4,513,400 | 4/1985 | Masaki | 365/240 |
| 4,701,916 | 10/1987 | Naven et al. | 395/183.06 |
| 4,905,176 | 2/1990 | Schultz | 364/717 |
| 5,051,997 | 9/1991 | Sakashita et al. | 371/22.4 |
| 5,187,676 | 2/1993 | DeVane | 364/717 |
| 5,473,708 | 12/1995 | Werth | 382/160 |

OTHER PUBLICATIONS

IBM CORP 1993, Random Instruction Sequence Test Program, IBM Technical Disclosure Bulletin, Feb. 1990, US. 1990.

"The Design and Analysis Of VLSI Circuits", Lance A. Glasser et al., Addison–Wesley 1985, pp. 421–435.

Khambata, Adi J., "Microprocessors/Computers", John Wiley & Sons, 1982, ISBN 0-471-06490-4, pp. 12–13.

Tietze, Ulrich; Schenk, Christoph, "Halbleiterschaltungs-technik, 5th edit., Springer–Verlag", 1980, ISBN 3-540-09848-8, pp. 509–512.

*Primary Examiner*—Krisna Lim
*Assistant Examiner*—Saleh Najjar
*Attorney, Agent, or Firm*—Lowe, Price, LeBlanc & Becker

[57] ABSTRACT

Instructions of a program are stored at addresses sequentially designated in accordance with an M series pseudo-random number sequence in an instruction memory in the order of program addresses. A pseudo-random number program counter has a feedback shift register for generating the same M series pseudo-random number sequence and applies an address of an instruction to be read from the instruction memory to the instruction memory based on a generated pseudo-random number, and a jump address and a select signal from an instruction decoder. As a result, instructions are read from the instruction memory and executed in the order of program addresses. The feedback shift register can be implemented as a small-scale circuit and operable at high speed.

7 Claims, 16 Drawing Sheets

FIG. 8

| NUMBER | O7 — O0 | DECIMAL NOTATION |
|---:|---:|---:|
| 0 | 0000000 | 0 |
| 1 | 0000001 | 1 |
| 2 | 0000011 | 3 |
| 3 | 0000111 | 7 |
| 4 | 0001110 | 14 |
| 5 | 0011100 | 28 |
| 6 | 0111000 | 56 |
| 7 | 1110001 | 113 |
| 8 | 1100010 | 98 |
| 9 | 1000100 | 68 |
| 10 | 0001001 | 9 |
| 11 | 0010011 | 19 |
| 12 | 0100111 | 39 |
| 13 | 1001110 | 78 |
| 14 | 0011101 | 29 |
| 15 | 0111010 | 58 |
| 16 | 1110101 | 117 |
| 17 | 1101011 | 107 |
| 18 | 1010110 | 86 |
| 19 | 0101101 | 45 |
| 20 | 1011010 | 90 |
| 21 | 0110100 | 52 |
| 22 | 1101000 | 104 |
| 23 | 1010000 | 80 |
| 24 | 0100000 | 32 |
| 25 | 1000001 | 65 |
| 26 | 0000010 | 2 |

FIG. 9

| NUMBER | O7 - O0 | DECIMAL NOTATION |
|---|---|---|
| 27 | 0000101 | 5 |
| 28 | 0001010 | 10 |
| 29 | 0010101 | 21 |
| 30 | 0101010 | 42 |
| 31 | 1010101 | 85 |
| 32 | 0101011 | 43 |
| 33 | 1010111 | 87 |
| 34 | 0101111 | 47 |
| 35 | 1011110 | 94 |
| 36 | 0111101 | 61 |
| 37 | 1111010 | 122 |
| 38 | 1110100 | 116 |
| 39 | 1101001 | 105 |
| 40 | 1010010 | 82 |
| 41 | 0100100 | 36 |
| 42 | 1001000 | 72 |
| 43 | 0010000 | 16 |
| 44 | 0100001 | 33 |
| 45 | 1000011 | 67 |
| 46 | 0000110 | 6 |
| 47 | 0001100 | 12 |
| 48 | 0011000 | 24 |
| 49 | 0110001 | 49 |
| 50 | 1100011 | 99 |
| 51 | 1000110 | 70 |
| 52 | 0001101 | 13 |
| 53 | 0011010 | 26 |

FIG. 10

| NUMBER | O7 - O0 | DECIMAL NOTATION |
|---|---|---|
| 54 | 0110101 | 53 |
| 55 | 1101010 | 106 |
| 56 | 1010100 | 84 |
| 57 | 0101001 | 41 |
| 58 | 1010011 | 83 |
| 59 | 0100110 | 38 |
| 60 | 1001100 | 76 |
| 61 | 0011001 | 25 |
| 62 | 0110011 | 51 |
| 63 | 1100111 | 103 |
| 64 | 1001111 | 79 |
| 65 | 0011111 | 31 |
| 66 | 0111110 | 62 |
| 67 | 1111100 | 124 |
| 68 | 1111001 | 121 |
| 69 | 1110010 | 114 |
| 70 | 1100100 | 100 |
| 71 | 1001001 | 73 |
| 72 | 0010010 | 18 |
| 73 | 0100101 | 37 |
| 74 | 1001010 | 74 |
| 75 | 0010100 | 20 |
| 76 | 0101000 | 40 |
| 77 | 1010001 | 81 |
| 78 | 100010 | 34 |
| 79 | 1000101 | 69 |
| 80 | 0001011 | 11 |

FIG. 11

| NUMBER | O7 - O0 | DECIMAL NOTATION |
|---:|:---:|---:|
| 81 | 0010111 | 23 |
| 82 | 0101110 | 46 |
| 83 | 1011100 | 92 |
| 84 | 0111001 | 57 |
| 85 | 1110011 | 115 |
| 86 | 1100110 | 102 |
| 87 | 1001101 | 77 |
| 88 | 0011011 | 27 |
| 89 | 0110111 | 55 |
| 90 | 1101110 | 110 |
| 91 | 1011101 | 93 |
| 92 | 0111011 | 59 |
| 93 | 1110111 | 119 |
| 94 | 1101111 | 111 |
| 95 | 1011111 | 95 |
| 96 | 0111111 | 63 |
| 97 | 1111110 | 126 |
| 98 | 1111101 | 125 |
| 99 | 1111011 | 123 |
| 100 | 1110110 | 118 |
| 101 | 1101101 | 109 |
| 102 | 1011011 | 91 |
| 103 | 0110110 | 54 |
| 104 | 1101100 | 108 |
| 105 | 1011001 | 89 |
| 106 | 0110010 | 50 |
| 107 | 1100101 | 101 |

FIG. 12

| NUMBER | O7 - O0 | DECIMAL NOTATION |
|---|---|---|
| 108 | 1001011 | 75 |
| 109 | 0010110 | 22 |
| 110 | 0101100 | 44 |
| 111 | 1011000 | 88 |
| 112 | 0110000 | 48 |
| 113 | 1100001 | 97 |
| 114 | 1000010 | 66 |
| 115 | 0000100 | 4 |
| 116 | 0001000 | 8 |
| 117 | 0010001 | 17 |
| 118 | 0100011 | 35 |
| 119 | 1000111 | 71 |
| 120 | 0001111 | 15 |
| 121 | 0011110 | 30 |
| 122 | 0111100 | 60 |
| 123 | 1111000 | 120 |
| 124 | 1110000 | 112 |
| 125 | 1100000 | 96 |
| 126 | 1000000 | 64 |
| 127 | 0000000 | 0 |

FIG. 13

| | PROGRAM | | |
|---|---|---|---|
| PROGRAM ADDRESS | INSTRUCTION | | PROGRAM ADDRESS OF REAL MEMORY |
| 0 | INSTRUCTION 1 | → | 0 |
| 1 | INSTRUCTION 2 | → | 1 |
| 2 | INSTRUCTION 3 | → | 3 |
| ⋮ | ⋮ | | ⋮ |
| 1 0 | INSTRUCTION 1 1 | → | 9 |
| ⋮ | ⋮ | | |
| 6 0 | INSTRUCTION 6 1 | → | 2 5 |
| ⋮ | ⋮ | | ⋮ |
| 1 2 6 | INSTRUCTION 1 2 7 | → | 6 4 |

PROGRAM EXECUTION CONTROL DEVICE HAVING ADDRESSABILITY IN ACCORDANCE WITH M SERIES PSEUDO-RANDOM NUMBER SEQUENCE

BACKGROUND OF THE INVENTION

1. Field of the Invention

The present invention relates generally to program execution control devices for storing instructions in an instruction storage device and designating addresses of the device to read the instructions in a specific order and apply the same to a program execution device and a method thereof. More particularly, the present invention relates to a program execution control device which is capable of performing such instruction reading at high speed while requiring a relatively small-scale circuit and a method thereof, and a program conversion method for converting a program into a form readable by such a program execution control device and by such a method.

2. Description of the Related Art

FIG. 1 shows an example of a conventional program execution control device (hereinafter referred to as a "program control unit") for controlling a program execution order in a microprocessor or the like. With reference to FIG. 1, a conventional program control unit includes a program counter (PC) 300, an instruction memory 32, an instruction decoder 34, an incrementer 302 and a selector 304.

Instruction memory 32 stores instructions of a program in the order of program addresses. Program addresses are ordinarily set to be incremented one by one. In instruction memory 32, the program addresses are arranged in a continuous memory space whose addresses are incremented one by one. Instruction memory 32 is for reading an instruction word 38 (of m-bit) from an applied n-bit address 310 and applying the word to instruction decoder 34.

Instruction decoder 34 is for decoding m-bit instruction word 38 to apply an l-bit control signal 40 according to the instruction to an execution device such as an arithmetic logic unit. Instruction decoder 34 also decodes an instruction word to output a select signal 42, a jump address and the like to selector 304.

Selector 304 is for selecting either an n-bit output 306 from incrementer 302 or n-bit jump address 44 from instruction decoder 34 in response to select signal 42 applied from instruction decoder 34 to apply the selected output or address as an output 308 (of n-bit) to program counter 300.

Program counter 300 is for outputting address 310 for the read of an instruction word from instruction memory 32. Output 310 of program counter 300 is applied also to incrementer 302.

Incrementer 302 is for incrementing (adding 1) to the contents of program counter 300 and applying n-bit output 306 to selector 304.

The program control unit shown in FIG. 1 operates as follows. First, program counter 300 is set to 0 through reset operation or the like. With output 310 of program counter 300 as an address, an instruction of instruction memory 32 at address 0 is read as instruction word 38. The read instruction word 38 is decoded by instruction decoder 34 and select signal 42, control signal 40, jump address 44 and the like are output.

Output 310 of program counter 300 is at the same time applied to incrementer 302, incremented there and applied to selector 304. When select signal 42 from instruction decoder 34 controls selector 304 so as to select the output of incrementer 302, selector 304 selects output 306 of incrementer 302 and applies the same to program counter 300. As long as select signal 42 has a value for selecting the output of incrementer 302, therefore, output 310 of program counter 300 is incremented one by one.

When an instruction decoded by instruction decoder 34 is a branch instruction, instruction decoder 34 outputs jump address 44, as well as applying select signal 42 for controlling selector 304 so as to select jump address 44 to selector 304. Selector 304 selects jump address 44 and applies the same to program counter 300. In this case, therefore, the value of program counter 300 is set to the jump address.

Although FIG. 1 shows only a schematized simple example, call addresses, return addresses, interrupt addresses etc. of a sub-routine other than those shown in the figure are to be selected by selector 304 in practice.

FIG. 2 shows a flow chart for down-loading a program into instruction memory 32 shown in FIG. 1. First at Step 90, programs are produced with a high-level language. These high-level language programs are converted into a machine language by an assembler, a linker and a compiler, while addresses are assigned to the instruction memory at Step 92. At Step 96, the program converted into a machine language is loaded into a real memory (instruction memory). Arrangement of instructions in the real memory in this case will be described later with reference to FIG. 3. Further at Step 320, the program arranged on the real memory is executed by a program counter.

FIG. 3 is an arrangement of program addresses on the real memory at the time of the program loading into the real memory at Step 96 shown in FIG. 2. With reference to FIG. 3, assuming that there are 127 instructions included in the program converted into the machine language by an assembler, a linker and a compiler, these instructions are referred to as instructions 1 to 127. Program addresses 0–126 are respectively assigned to these instructions. When the program is loaded into the real memory, the program address of each instruction will be an address incremented one by one with respect to the leading instruction 1 in the order of the original program addresses in the range from 0 to 126.

A conventional program control device requires an incrementer for incrementing a program counter. Increment processing inevitably involves addition processing. Delay caused by carry involved in addition processing reduces an operating speed of the incrementer. In view of a need for enhancing an operating speed of processors, it is not desirable to use such an incrementer slow in operation.

On the other hand, to increase a speed of addition processing, proposed in Japanese Patent Laying-Open No. 1-193931 for example, is a technique for speeding up operation of an incrementer by dividing the incrementer into a plurality of blocks and providing a carry control circuit for each block to generate a carry on a block basis to reduce a propagation delay caused by the carry. Such a device, however, has drawbacks that a circuit of an incrementer is increased in scale and improvement of an operating speed fails to offset an increase of a circuit in scale. In order to solve these problems, it is desirable to read instructions at high speed through effective use of a memory even when a large-scale program or numerous programs are executed.

SUMMARY OF THE INVENTION

An object of the present invention is to provide a program execution control device capable of reading instructions at high speed which is realized by a relatively small-scale circuit and a method thereof.

Another object of the present invention is to provide a program execution control method allowing a relatively small-scale circuit to read instructions at high speed and enabling execution of a large-scale program or numerous programs through effective use of a memory.

A further object of the present invention is to provide a program conversion method enabling conversion of a program into a form readable at high speed by a relatively small-scale circuit.

A program execution control device according to the present invention includes an instruction memory, a circuit for reading instructions from the instruction memory and an instruction decoder. The instruction memory stores instructions of a program at addresses designated in accordance with an M series pseudo-random number sequence in the order of program addresses of each instruction. The read circuit has a feedback shift register for generating an M series pseudo-random number sequence and reads an instruction from the instruction memory according to addressing based on the generated pseudo-random numbers and instruction execution results. The instruction decoder decodes a read instruction to output a control signal corresponding to the read instruction to a program execution device, while applying a select signal indicating whether a next pseudo-random number or a jump address determined by the read instruction is to be selected, and a jump address to the read circuit.

In this program execution control device, instructions at addresses sequentially designated in accordance with an M series pseudo-random number sequence are read from the instruction memory and applied to the decoder by the read circuit. The instruction memory stores instructions of the program at addresses designated by random numbers generated in the order of program addresses of the instructions in the range of the M series pseudo-random number sequence. The instructions are therefore read from the instruction memory and executed in accordance with the program addresses. In accordance with the M series pseudo-random number sequence, which is generated by the feedback shift register, pseudo-random numbers can be generated at high speed without addition processing. This enables the device according to the present invention to read instructions at higher speed than that by a conventional device employing a program counter and an incrementer. In addition, since a simple circuit, that is, a feedback register, can generate pseudo-random numbers, there is no need for increasing the scale of a circuit. As a result, a program execution control device capable of reading instructions at high speed can be realized by a relatively small-scale circuit.

The program execution control device according to another aspect of the present invention includes a program memory, a circuit for reading instructions from the program memory and a decoder. The program memory stores instructions of a program at addresses designated in accordance with an M series pseudo-random number sequence in the order of program addresses of the instructions. The circuit for reading instructions from the program memory generates pseudo-random numbers in accordance with the M series pseudo-random number sequence to read instructions from the program memory, with the generated pseudo-random numbers as addresses. The decoder decodes the read instructions to execute processing according to the read instructions. In accordance with the M series pseudo-random number sequence, which is generated, for example, by a feedback shift register, pseudo-random numbers can be generated at high speed without an adder. This enables the device of the present invention to read instructions at higher speed than that by a conventional device using a program counter and an incrementer. In addition, since a simple circuit, that is, a feedback register, can generate pseudo-random numbers, increase of a circuit in scale can be avoided. As a result, a program execution control device capable of reading instructions at high speed can be realized by a relatively small-scale circuit.

The program execution control method according to a further aspect of the present invention includes steps of preparing an instruction memory, reading an instruction from the instruction memory, decoding the read instruction, and repeatedly executing the reading and decoding steps until a predetermined condition is satisfied. In the instruction memory preparing step, an instruction memory is prepared which stores instructions of a program at addresses sequentially designated in accordance with an M series pseudo-random number sequence in the order of program addresses of the instruction. In the reading step, pseudo-random numbers are generated by using a feedback shift register for generating pseudo-random numbers in accordance with the M series pseudo-random number sequence. Instructions are read from the instruction memory by addressing based on the generated pseudo-random numbers and instruction execution results. In the decoding step, the read instruction is decoded to output a control signal corresponding to the read instruction to a program execution device. Further output are a select signal indicating which is to be selected an address designated by a next pseudo-random number or a jump address determined by the read instruction, and a jump address. The reading step and the decoding step are repeatedly executed until a predetermined condition is satisfied.

According to this program execution control method, repetitious execution of the reading step and the outputting step until a predetermined condition is satisfied leads to reading and execution of instructions in the order of program addresses not by addressing using a program counter but by addressing in accordance with a pseudo-random number sequence. Since the M series pseudo-random number sequence is generated at high speed, a higher instruction reading speed can be obtained than that achieved by using an incrementer. In addition, the M series pseudo-random number sequence can be generated by a relatively small-scale circuit using a feedback shift register, for example.

As a result, a program execution control method can be provided which enables high-speed reading of instructions with a relatively small-scale circuit.

In accordance with a still further aspect of the present invention, the program execution control method includes a step of dividing a program into a plurality of segments, a step of dividing the instruction memory into a plurality of segment storage regions, a step of modifying an array of instructions, a first step of specifying an instruction to be executed by the program execution device, a step of reading an instruction to be executed from the instruction memory, a step of decoding the read instruction, a second step of specifying an instruction to be read next, and a step of repeatedly executing the reading step, the outputting step and the second specifying step until a predetermined condition is satisfied.

According to this program execution control method, in the step of modifying an array of instructions, the arrangement of the instructions is modified such that instructions contained in each of the plurality of segments are arranged at positions sequentially designated in accordance with an M series pseudo-random number sequence in the order of program addresses. In the step of reading an instruction to be executed from the instruction memory, determination is made as to whether there exists in the instruction memory a segment instruction including an instruction to be executed among the plurality of segments including the instructions whose arrangement is modified. When the segment does not exist in the instruction memory, the segment is loaded into a selected segment region, out of the plurality of segment regions, based on the predetermined condition and the instruction to be executed is read from the instruction memory. In the step of decoding a read instruction, a control signal corresponding to the read instruction is output to the program execution device. Further output are a select signal indicating which is to be selected between an address designated by a next pseudo-random number or a jump address determined by a decoding result, and a jump address. In the step of specifying an instruction to be read next, pseudo-random numbers are generated in accordance with the same M series pseudo-random number sequence as that used for the modification of the instruction arrangement to specify an instruction to be read next by addressing based on the generated pseudo-random numbers, the select signal and the jump address.

Since the M series pseudo-random number sequence is operable at higher speed than that of a conventional method using a program counter and an incrementer, it is possible to read instructions at higher speed than by a conventional device and use a smaller-scale circuit than that employing an incrementer. In addition, because instructions are rearranged on a segment basis, even if a segment not including an instruction to be executed at present does not exist in the instruction memory, execution of the program will not be adversely affected. Instruction memory regions for these segments therefore can be utilized for other purposes, which enables effective use of the instruction regions. As a result, it is possible to provide a program execution control method which enables high-speed reading of instructions by using a relatively small-scale circuit and execution of a large-scale program or numerous programs through effective use of a memory.

According to a still further aspect of the present invention, the program conversion method includes a step of preparing a table, a correlating step and a storing step. In the step of preparing a table, a table is prepared in which a series of pseudo-random numbers generated in accordance with an M series pseudo-random number sequence are arranged in the order of generation of the pseudo-random numbers. In the correlating step, each instruction of a program is correlated with a pseudo-random number whose generation order corresponds to the order of its program address of the instruction with reference to the tables. In the storing step, an instruction of a program is stored at an address designated by a correlated pseudo-random number in the instruction memory.

According to this program conversion method, a program is divided into segments and an arrangement of instructions of the program is modified on a segment basis. It is therefore possible to read instructions according to program addresses before modification of the arrangement by generating pseudo-random numbers in accordance with the same M series pseudo-random number sequence as that for the modification of the arrangement by means of a feedback shift register and accessing the instruction memory, with the pseudo-random numbers as addresses.

An M series pseudo-random number sequence allows a small-scale circuit such as a feedback shift register to generate pseudo-random numbers at higher speed than conventional address generation using a program counter and an incrementer. Instructions of a program converted by this program conversion method can be therefore read at higher speed than the program before conversion. This realizes a program conversion method which enables conversion of a program into a form readable at high speed by a relatively small-scale circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a schematic diagram showing a part of the contents of an address conversion table.

FIG. 9 is a schematic diagram showing a part of the contents of the address conversion table.

FIG. 10 is a schematic diagram showing a part of the contents of the address conversion table.

FIG. 11 is a schematic diagram showing a part of the contents of the address conversion table.

FIG. 12 is a schematic diagram showing a part of the contents of the address conversion table.

FIG. 13 is a schematic diagram showing processing of converting the program to be executed in the first embodiment of the present invention.

DESCRIPTION OF THE PREFERRED EMBODIMENTS

The present invention will be described in detail with respect to two embodiments in the following. The first embodiment is intended for the execution of a single program, while the second embodiment is intended for the execution of a plurality of programs or a large program made up of a plurality of segments by making the most of an instruction memory. As to the first embodiment, description will be also given of two modifications. Although in the following embodiments, description will be made on the assumption that random numbers generated by a pseudo-random number sequence are of a specific number of bits, the present invention is not limited to such a specific number of bits but is applicable to any number of bits depending on assumed machine.

First Embodiment

Figure 1:
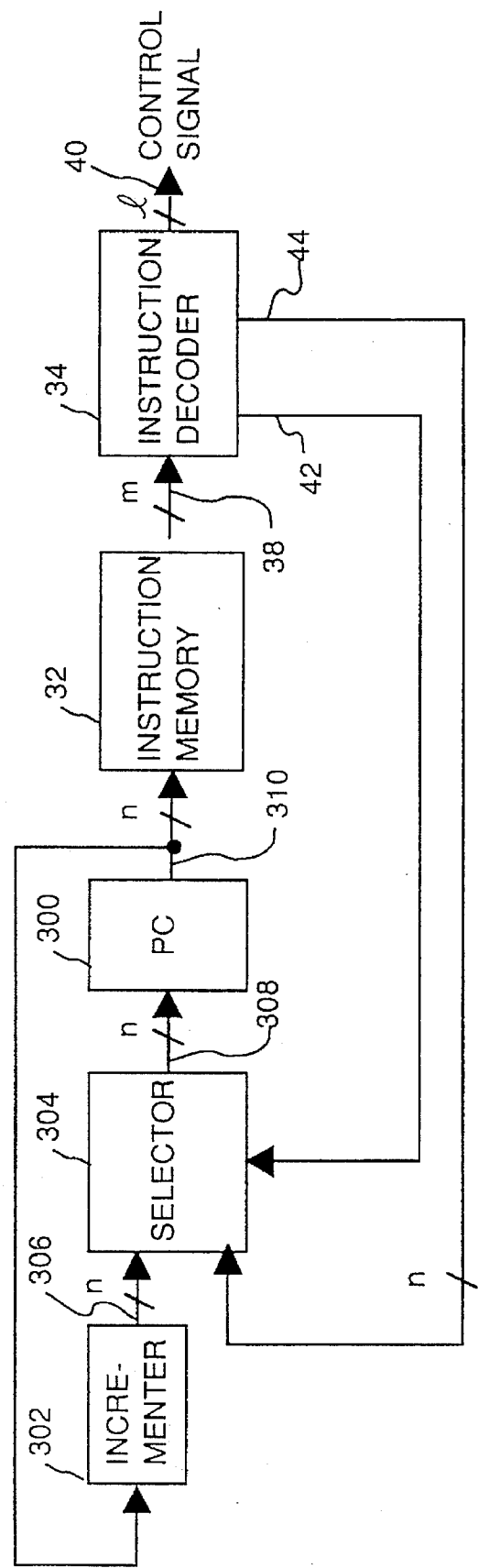
FIG. 1 is a block diagram of a conventional program execution control device.
Figure 2:
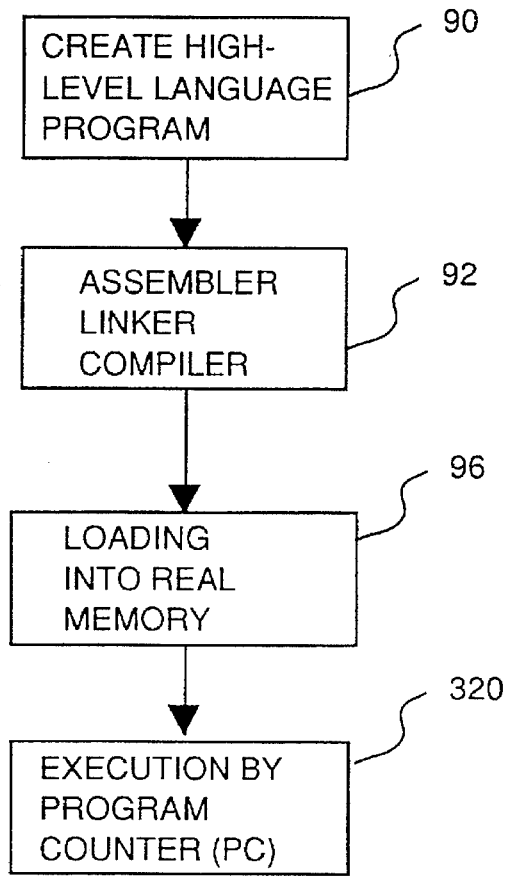
FIG. 2 is a flow chart of processing for producing and executing a program to be executed by a conventional program execution control device.
Figure 3:
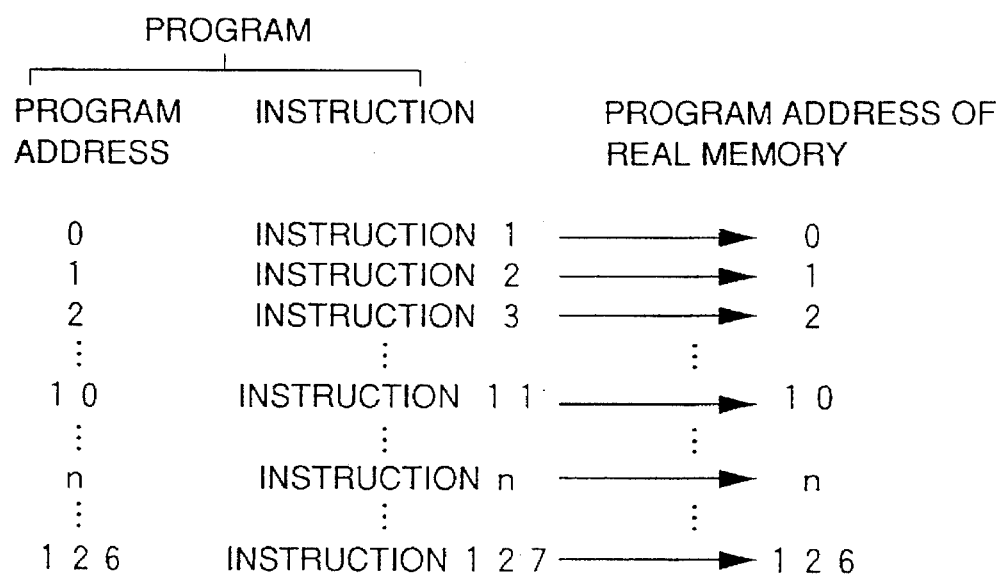
FIG. 3 is a diagram schematically showing program addresses, on a real memory, of a program to be executed by a conventional program execution control device.
Figure 4:
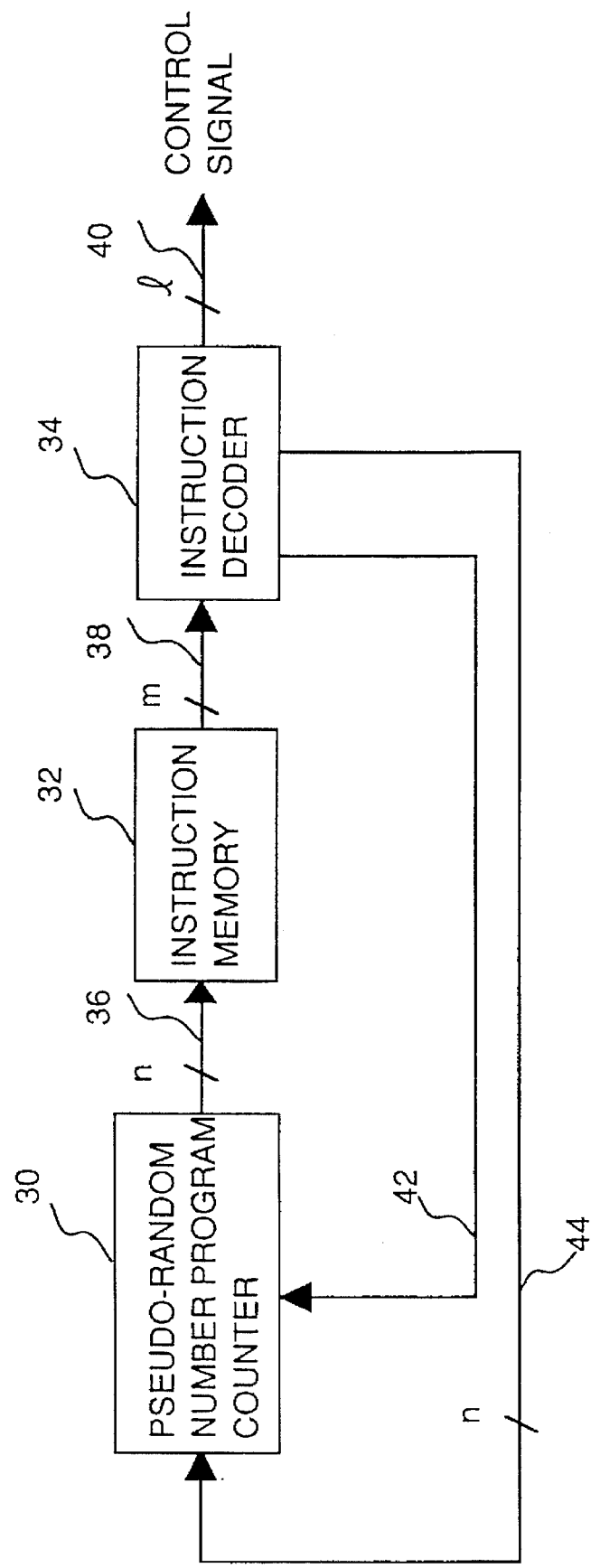
FIG. 4 is a block diagram of a program execution control device according to a first embodiment of the present invention.

FIG. 4 is a block diagram of a program control unit of the first embodiment of the present invention. With reference to FIG. 4, the program control unit of the present embodiment includes an instruction memory 32, an instruction decoder and a pseudo-random number program counter 30. Instruction memory 32 and instruction decoder 34 are the same as those of the conventional device shown in FIG. 1, except that a program stored in instruction memory 32 is different from that of FIG. 1. The program will be detailed later. An output 38 of instruction memory 32, a control signal 40, a select signal 42 and a jump address 44 output from instruction decoder 34 are also the same as those shown in FIG. 1 and no detailed description thereof will be repeated here.

Pseudo-random number program counter 30, having a feedback shift register provided therein for generating M series pseudo-random numbers, is for outputting an address 36 of an instruction to be read next from instruction memory 32 based on the pseudo-random numbers, and jump address 44 and select signal 42 applied by instruction decoder 34. The present embodiment will be described with "n" being "7".

Figure 5:
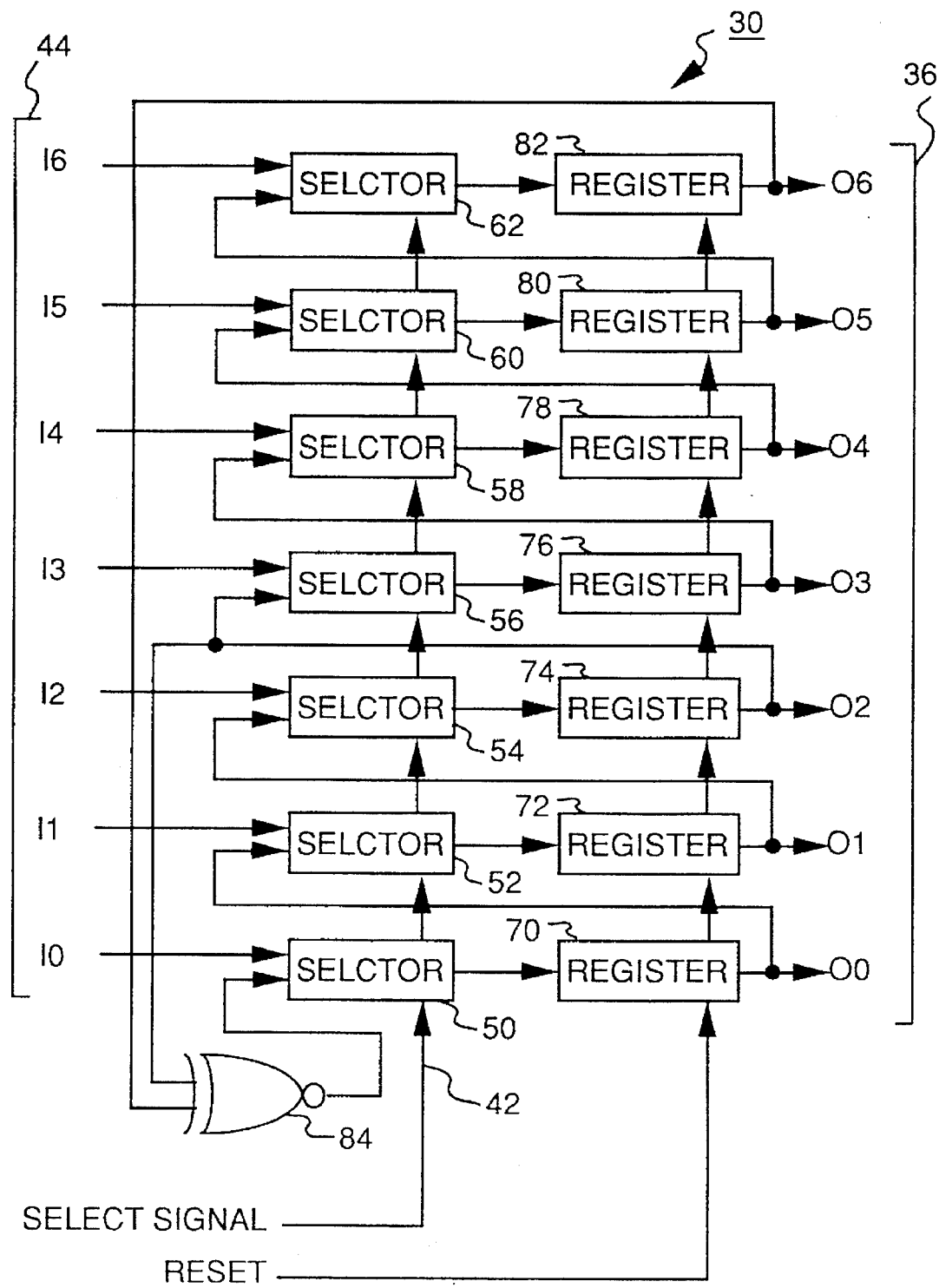
FIG. 5 is a block diagram of a circuit of a pseudo-random number program counter.

With reference to FIG. 5, pseudo-random number program counter 30 includes seven registers 70, 72, 74, 76, 78, 80 and 82, seven selectors 50, 52, 54, 56, 58, 60 and 62 provided corresponding to these registers and an non-exclusive OR circuit 84 for NON-EXCLUSIVE ORing the outputs of registers 74 and 82 to feed back the non-exclusive OR to one input of first selector 50.

Ones of respective inputs of selectors 50 to 62 are applied with bits 0 to 6 (I0–I6) of jump address 44, respectively. The other input of selector 50 is applied with the output of non-exclusive OR circuit 84. The other inputs of selectors 52 to 62 are applied with the outputs of registers 70 to 80, respectively. The outputs of selectors 50 to 62 are applied to the inputs of their corresponding registers 70 to 82. Registers 70 to 82 output bits 0 to 6 (O0–O6) of 7-bit output 36, respectively.

Selector 50 is for selecting bit 0 (I0) of jump address 44 in a case where select signal 42 indicates selection of the jump address and for selecting the output of non-exclusive OR circuit 84 in other cases to apply the same to register 70. Selector 52 is for selecting input I1 in a case where select signal 42 indicates selection of jump address 44 and for selecting the output of register 70 at the preceding stage in other cases to apply the same to its corresponding register 72. The other selectors 54 to 62 operate similarly to selector 52.

When select signal 42 selects jump address 44, bits I0–I6 of jump address 44 are set to registers 70–82 through selectors 50–62, respectively. In other cases, registers 70 to 82 are connected in series through selectors 50 to 62 to constitute one shift register. Because the outputs of registers 82 and 74 are fed back to the input of selector 50 corresponding to first register 70 through non-exclusive OR circuit 84, these registers 70 to 82 and non-exclusive OR circuit 84 constitute a feedback shift register in this case. By initially setting 0 to each of registers 70 to 82 of this feedback shift register and shifting them bit by bit through a path of the feedback loop, a 7-bit M series pseudo-random number sequence is obtained at output 36. As will be descried later, this M series pseudo-random number sequence is known to take a $127(2^7-1)$ number of values, that is, 0 to 126, in a seemingly random order. The pseudo-random number sequence of this case will be described later with reference to FIGS. 8 to 12. The circuit shown in FIG. 5 operates in synchronization with a clock signal (detailed description thereof is not given here).

Figure 6:
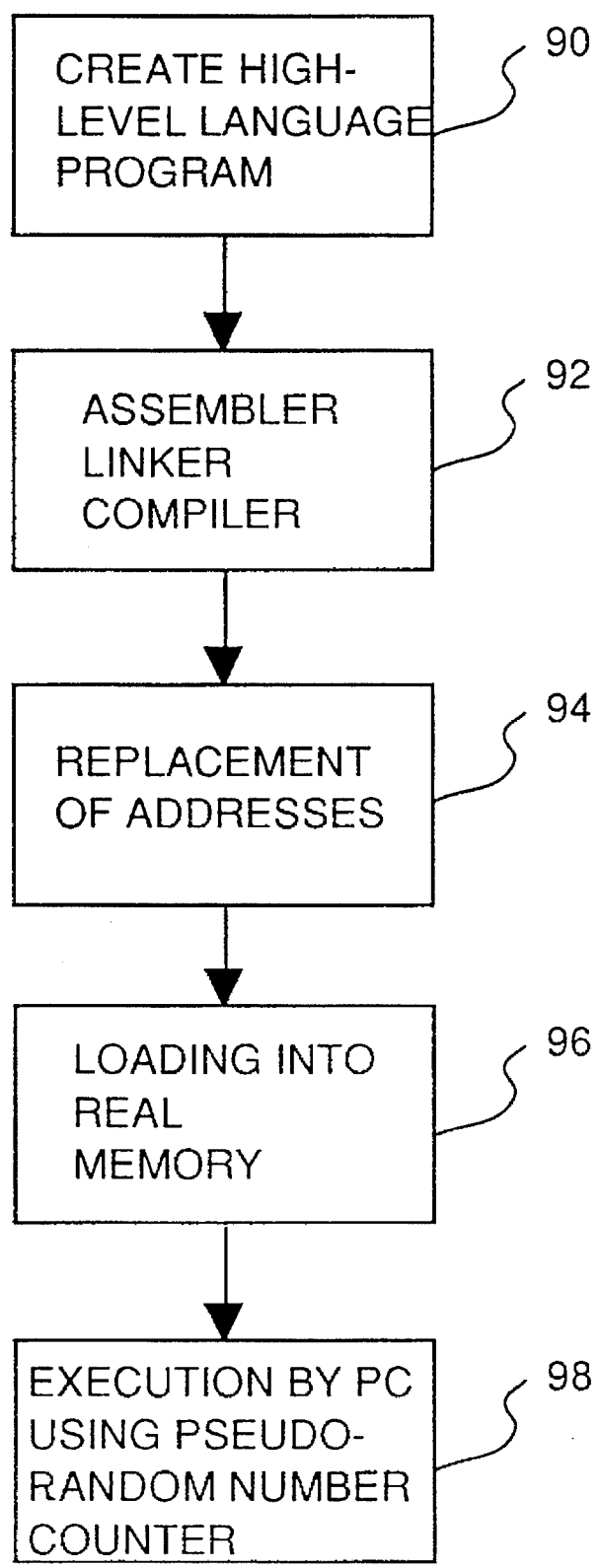
FIG. 6 is a flow chart of processing for producing a program to be executed by the program execution control device of the first embodiment of the present invention.

With reference to FIG. 6, the program stored in instruction memory 32 shown in FIG. 4 is produced as follows. At Step 90, a high-level language program is prepared in a conventional manner. At Step 92, the high-level language program is converted into a machine language by using an assembler, a linker and a compiler. Machine word instructions are ordinarily allotted program addresses incremented one by one.

At Step 94, replacement of thus prepared machine language program addresses is carried out. The replacement will be detailed later with reference to FIGS. 7 to 13. Further at Step 96, the program whose addresses are thus replaced is loaded into a real memory. Then, at Step 98, the program execution control device shown in FIG. 4 controls the program counter using a pseudo-random number counter to execute this program.

Figure 7:
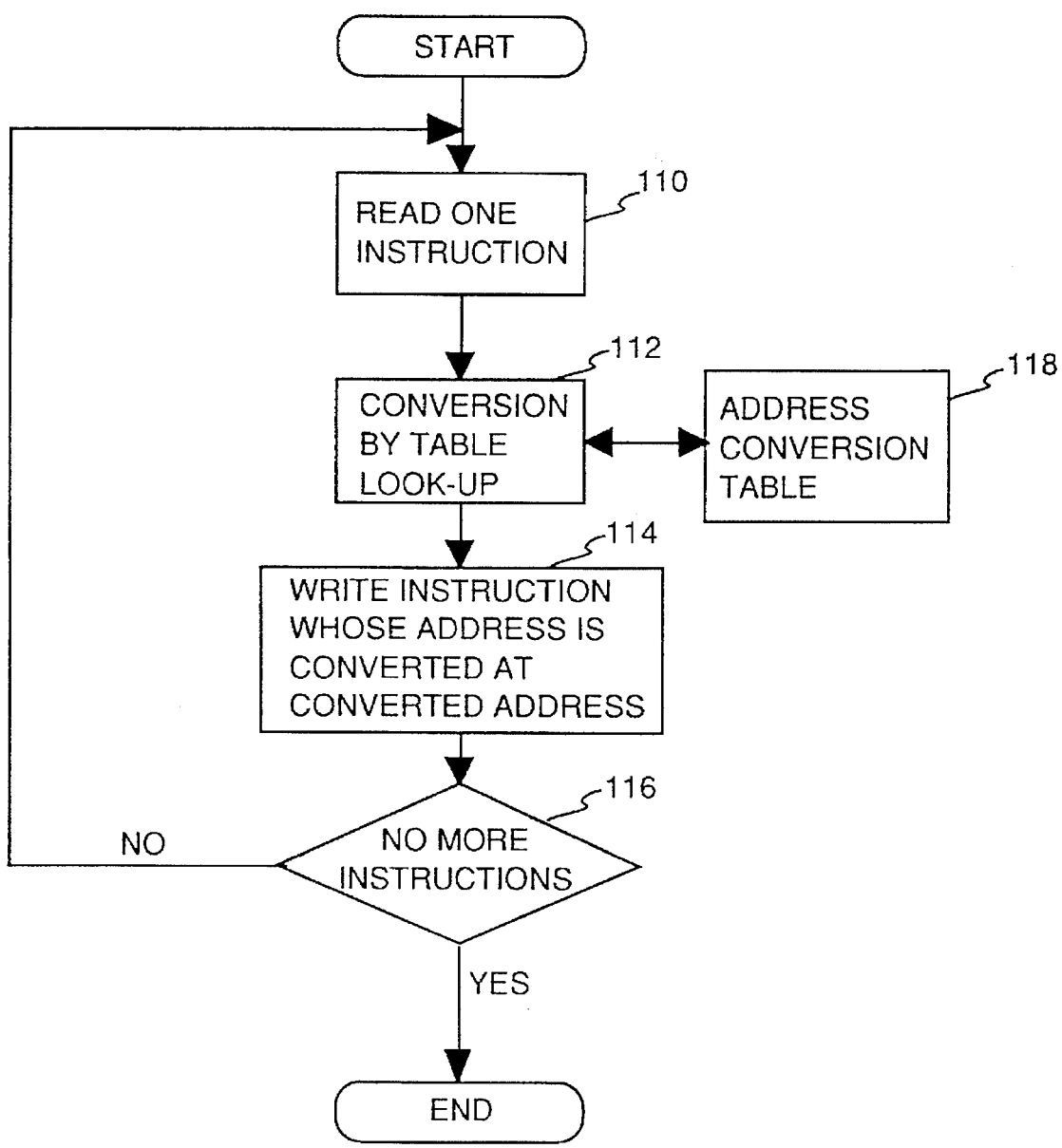
FIG. 7 is a flow chart of program address replacement processing.

FIG. 7 is a flow chart showing the address replacement processing at Step 94 in FIG. 6 in detail. The processing shown in the flow chart can be conducted by a common computer. First at Step 110, a first instruction is read. At Step 112, an address of the read instruction is replaced by using an address conversion table 118. Shown in FIGS. 8 to 12 are the contents of address conversion table 118, meanings of which will be described later.

At Step 114, the instruction whose address is converted is written at an after-conversion address in other storage region than that where the original program is stored. At Step 116, determination is made as to whether address conversion processing is completed with respect to all the instructions. When the processing for all the instructions is completed, the address replacement processing ends. If there remains an instruction whose address conversion is yet to be made, the processing returns to Step 110 to repeat the processing of Steps 110 to 116 with respect to a next instruction.

FIGS. 8 to 12 are illustration of the contents of address conversion table 118 shown in FIG. 7, which contents will be referred to as first, second and third columns from left in the drawing. The second column stores pseudo-random numbers generated by pseudo-random number program counter 30 shown in FIG. 5 in the order of generation of the numbers. It is assumed in this case that "all 0" is selected as an initial state. Stored in the first column are numbers each indicating an order of occurrence, in the M series random-number sequence, of each random number indicated in the second column. These numbers also represent addresses at which the respective random numbers are stored in address conversion table 118. Appearing in the third column are decimal expressions of values indicated in the second column for the purpose of facilitating understanding.

As shown in FIGS. 8 to 12, pseudo-random number program counter 30 illustrated in FIG. 5 takes one integer in the range from 0 to 126 once in a cycle made up of 127 values (No. 0 to No. 126). The order of occurrence of the values, 0, 1, 3, 7, 14, 28, 56, 113, 98, 68, 9 . . . as indicated in the third column, seems to be random. Although these values repeatedly occur in a predetermined order in accordance with a fixed sequence in practice as can be seen in FIGS. 8 to 12, its regularity can not be easily appreciated only by observing a part of the values. This is why this sequence is referred to as "pseudo-random numbers".

The table shown in FIGS. 8 to 12 is accessed, with a program address of an instruction to be converted as an address, a value of the second column stored at the address is replaced by the program address of the instruction and the instruction is shifted to the replacing address.

The state of the program whose addresses are thus replaced is shown in FIG. 13. With reference to FIG. 13, it is assumed that instructions 1 to 127 are originally allotted with program addresses 0 to 126, respectively. When these instructions are stored at the addresses converted by the address conversion table shown in FIGS. 8 to 12 and loaded into the real memory, the respective instructions are stored at seemingly random addresses, for example, instruction 1 is stored at address 0, instruction 2 at address 1, instruction 3 at address 3, instruction 11 at address 9, instruction 6 at address 25 and instruction 127 at address 64.

Operation of the program execution control device of the first embodiment will be described in the following, assuming that instruction memory 32 of FIG. 4 prestores the program whose addresses are replaced in the above-described manner. With reference to FIG. 5, first, registers 70 to 82 are set at 0 in response to a reset signal. Each of selectors 50 to 62 is set to select the output of the register at the preceding stage or of non-exclusive OR circuit 84. In this state, application of a clock signal to pseudo-random number program counter 30 shown in FIG. 5 leads to sequential generation of pseudo-random numbers as shown in FIGS. 8 to 12 and sequential application of the same as output 36 to instruction memory 32. If select signal 42 controls selectors 50 to 62 so as to always select the input on the feedback shift register side, the values of output 36 will be decimal values of 0, 1, 3, 7, 14, 28, 56, . . . , respectively (see the third column of FIGS. 9 to 12). Instructions 1, 2, 3, 4, 5, 6, . . . are respectively stored at these addresses. Accessing instruction memory 32 by output 36 of the pseudo-random number program counter therefore results in that each instruction of the program is output in the original order of program addresses and applied as output 38 to instruction decoder 34. Operation of instruction decoder 34 is the same as that of a conventional instruction decoder.

Here, at the time of instruction address replacement, a jump address value written in an instruction word is converted by using the conversion table in the same manner as in address conversion of each instruction. With a 7-bit address, for example, the instruction "to jump over to address 100" is converted to the instruction "to jump over to address 118" (see No. 100 in FIG. 11).

If branch occurs as a result of decoding of an instruction by instruction decoder 34, instruction decoder 34 applies jump address 44 to pseudo-random number program counter 30. Select signal 42 controls selectors 50 to 62 so as to respectively select their corresponding bits I0–I6 of jump address 44. Respective bits I0–I6 of jump address 44 are stored in registers 70 to 82 and applied to instruction memory 32 as bits O0–O6 of output 36. Addresses generated by pseudo-random number program counter 30 are replaced by jump addresses as a result.

The feedback shift register of pseudo-random number program counter 30 shown in FIG. 5 has its output determine a next random number output. Upon receiving a next clock and having each selector controlled to select an input on the feedback shift register side, pseudo-random number program counter 30 resumes generation of random numbers, with a jump address as a starting point.

The program execution control device according to this first embodiment therefore allows execution of a program in the same manner as is done by a device using a program counter and an incrementer. In addition, the pseudo-random number program counter is constituted by a feedback shift register which is a relatively simpler circuit of reduced space as illustrated in FIG. 5 than that required by a system using an incrementer.

Next program address generation only requires a delay time caused by non-exclusive OR circuit 84 and selectors 50 to 62, making operation possible with an extremely short delay time irrespective of the number of bits of an address. Pseudo-random number program counter 30 therefore has an effect of generating addresses for reading instructions at high speed.

Furthermore, a program to be executed by the program execution control device using this pseudo-random number program counter, can be produced only by replacing addresses of a program converted into a machine language similarly to a conventional program and replacing jump addresses included in instruction words. It is only necessary to insert an address replacement program in the course of processing but not to newly prepare an assembler, a linker or a compiler for the conversion into machine words. Besides, such address replacement processing is necessary only once.

Although the first embodiment has been described in a case of a 7-bit address, the present invention is not limited thereto. For example, any contents of a pseudo-random number program counter can be designed such that a feedback shift register is constituted corresponding to a necessary number of bits, such as 4-bit, 9-bit, 10-bit, 16-bit, etc. When in generating M series pseudo-random numbers, the arrangement of the pseudo-random number program counter is substantially the same as that shown in FIG. 5. and consideration should be given only to that the number of selectors and registers is modified and that selection of an output of a register as an input of non-exclusive OR circuit 84 differs according to the number of bits of an address.

Figure 14:
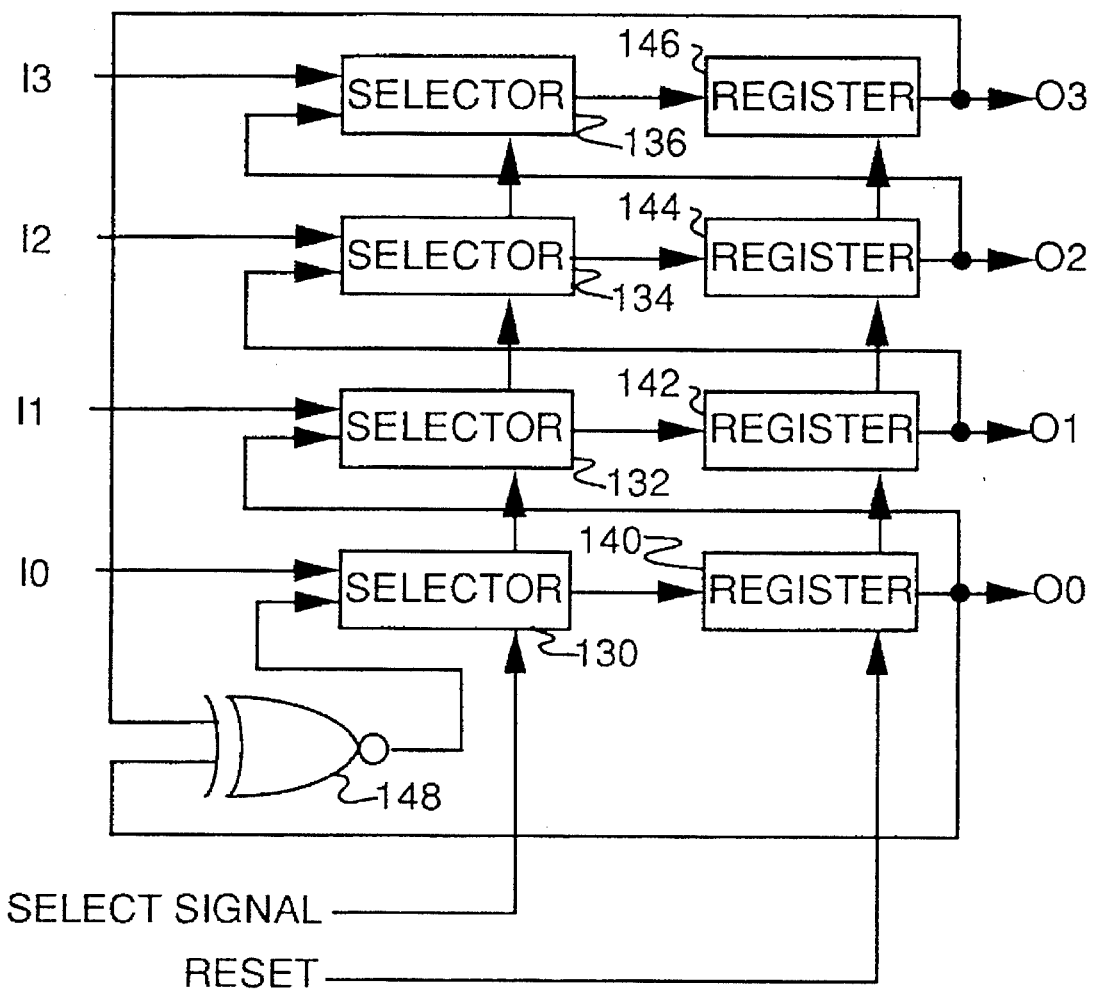
FIG. 14 is a block diagram of a circuit of a 4-bit pseudo-random number program counter.
Figure 15:
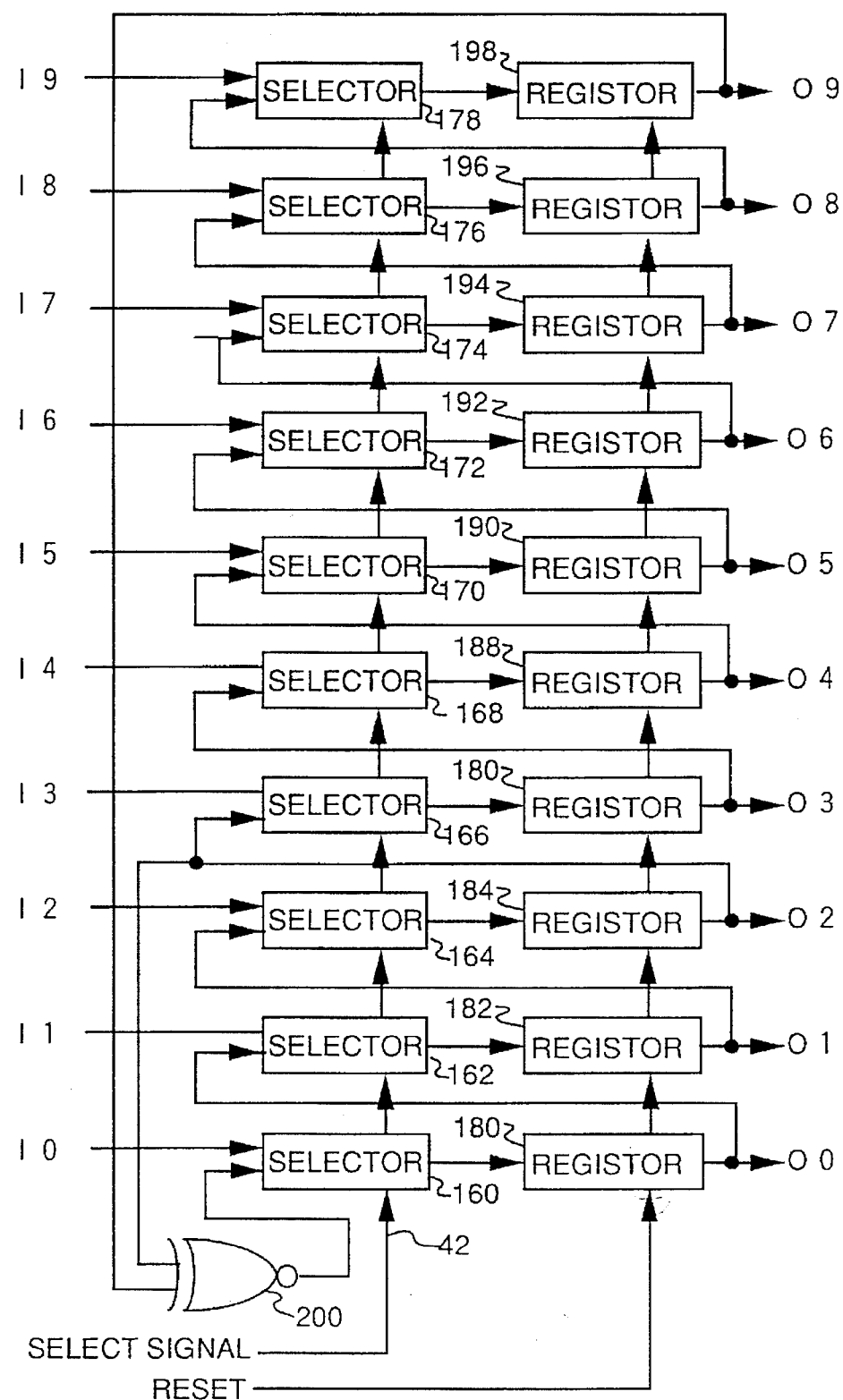
FIG. 15 is a block diagram of a circuit of a 10-bit pseudo-random number program counter.

FIGS. 14 and 15 show examples of arrangement of a 4-bit pseudo-random number program counter and a 10-bit pseudo random number program counter, respectively. The pseudo-random number program counter shown in FIG. 14 employs four selectors 130 to 136, four registers 140 to 146 and one non-exclusive OR circuit 148. Connection between the selectors and the registers is substantially the same as that of FIG. 5. In the embodiment illustrated in FIG. 14, selected as the input of non-exclusive OR circuit 148 are the output of fourth register 146 and the output of first register 140.

The 10-bit pseudo-random number program counter illustrated in FIG. 15 includes ten selectors 160 to 178, ten registers 180 to 198 and one non-exclusive OR circuit 200. Connection between the selectors and the registers is substantially the same as that in the examples shown in FIGS. 5 and 14. In FIG. 15, selected as the input of non-exclusive OR circuit 200 are the output of the third register and the output of 10th register 198.

Selection of the output of one of registers as the input of the non-exclusive OR circuit depends on how many bits a random number generated by the M series pseudo-random number sequence has. Generation of n-bit random numbers can lead to generation of a pseudo-random number sequence which takes one value in the range of 0 to $2^n-1$ once in a seemingly random order. Addressing an instruction memory in accordance with such an M series pseudo-random number sequence allows use of the memory with substantially the same efficiency as that using a program counter, while enabling reading of instructions at higher speed.

On the other hand, it is also possible to use a circuit which repeatedly generates pseudo-random numbers in a shorter cycle with the same number of bits in place of the M series pseudo-random number sequence. With this circuit, while instruction reading can be executed at higher speed than that using a program counter, memory utilization efficiency will be reduced.

Second Embodiment

In the above-described device according to the first embodiment, the entire instruction space is simultaneously converted into pseudo-random number addresses. In an incorporated microprocessor (microcontroller), for example, which has an instruction memory fixed in an LSI (large-scale integrated circuit), only a predetermined program should be operated. By reading instructions according to the first embodiment described above, the microprocessor can execute the same operation as that of a conventional device at higher speed.

In microprocessors for use in a workstation and the like, however, a plurality of programs are executed one after another or simultaneously, and a very large program is to be executed in some instances. To improve the memory utilization efficiency, therefore, a program is divided into segments and managed on a segment basis in many instances. One segment is made up of 256 words, for example. With a segment to which an instruction being executed belongs existing in an instruction memory, the other segments are written out on a secondary storage device as necessary and are read (loaded) into a real memory when necessary.

The program execution control device recited in the first embodiment is not adaptable to such a case without modification. If a large-scale program, which is not divided into segments, is executed after a lump-sum conversion of addresses in accordance with a pseudo-random number sequence, addresses of instructions to be executed will jump over to one place and another in a memory space. It is therefore impossible to efficiently execute the program unless all the segments are arranged on the instruction memory.

Arranging all the segments on the instruction memory, however, causes a problem that a memory space occupied by the program increases and a region usable for other purposes is reduced. As compared with a case where a program is managed on a segment basis by using a conventional device, in particular, memory efficiency is extremely deteriorated.

The second embodiment is intended for solving these problems. In the second embodiment, address conversion is carried out for each of segments of a program in accordance with a pseudo-random number sequence, whereby most of addresses generated by the program counter in accordance with the pseudo-random number sequence will exist in the same segment. Effective execution of instructions is therefore possible by arranging only the segment on the instruction memory. If the need to access other segment arises, the other segment may be loaded again into the instruction segment to resume access in accordance with the pseudo-random number sequence starting at the address.

Figure 16:
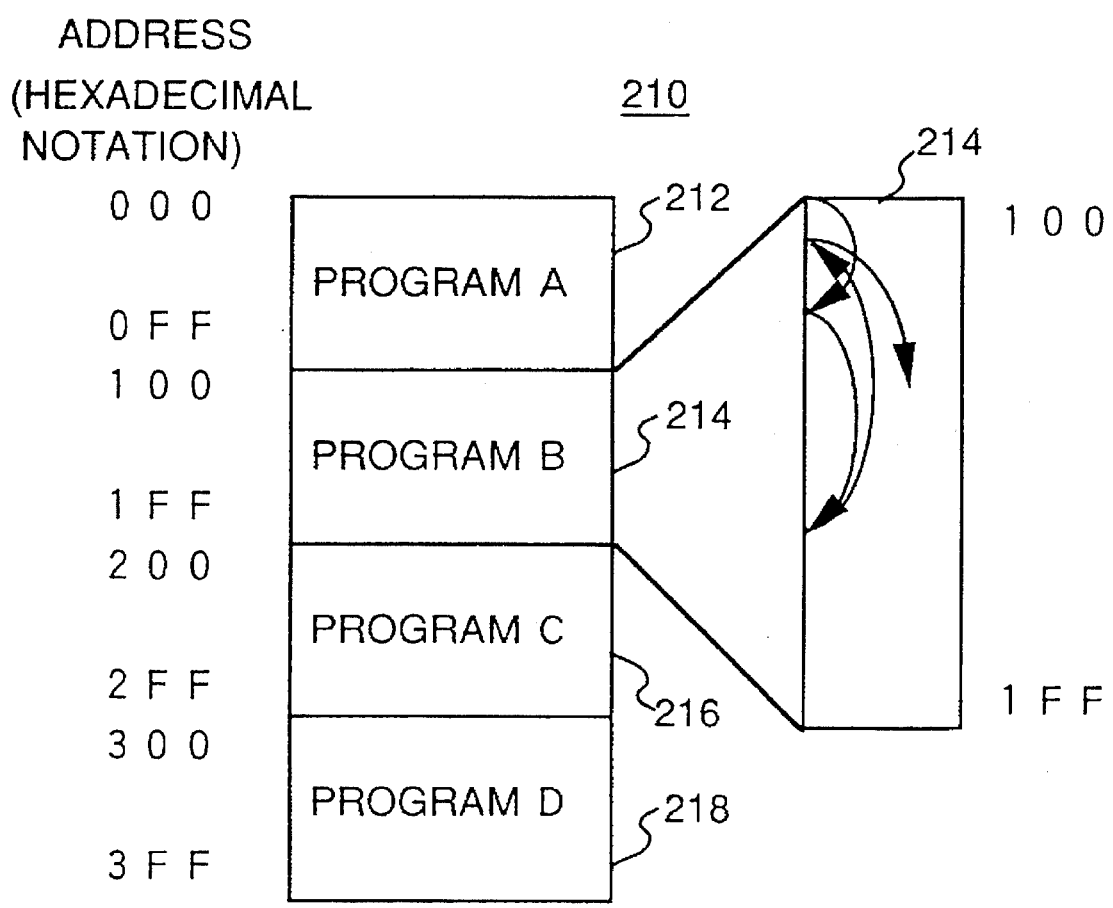
FIG. 16 is a conceptual diagram of a second embodiment of the present invention.

FIG. 16 is a conceptual diagram of the second embodiment. With reference to FIG. 16, it is assumed that a memory space 210 stores, for example, four segments 212, 214, 216 and 218, which respectively store different programs A to D and have addresses 000–0FF, 100–1FF, 200–2FF and 300–3FF. The addresses are expressed by hexadecimal values.

With respect to segment 214, for example, addresses of instructions internally stored therein are converted beforehand in accordance with a pseudo-random number sequence as described in the first embodiment. Then, the segment is accessed in accordance with the same pseudo-random number sequence at the time of execution. As a result, instructions can be read in the original order of program addresses of each instruction.

Although description has been given with respect to FIG. 16 that different programs are stored in the respective segments, different segment portions of the same program may be stored in the memory space.

Figure 17:
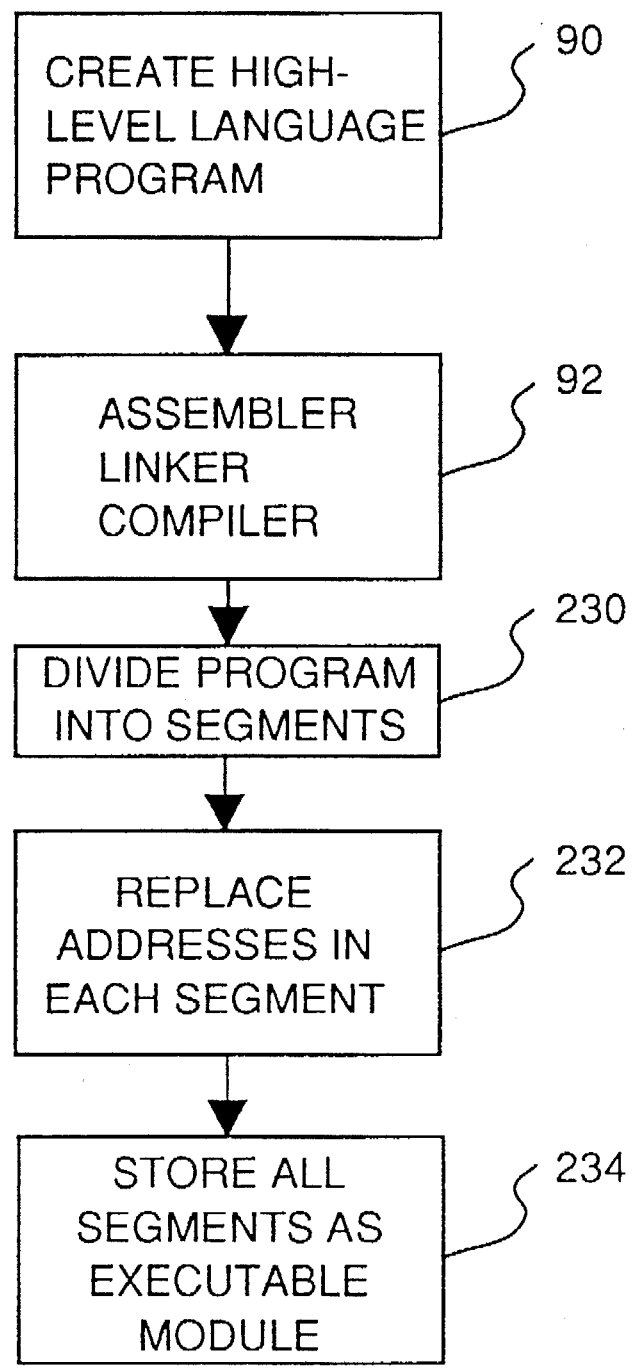
FIG. 17 is a flow chart of processing for producing a program to be executed in the second embodiment of the present invention.

FIG. 17 is a flow chart showing processing conducted at the time of producing a program to be executed in the second embodiment. Steps 90 and 92 are the same processings as those described in the first embodiment with reference to FIG. 6. Subsequently at Step 230, processing is executed for dividing an obtained machine language program into a plurality of segments. This processing is apparently unnecessary if the machine language program is smaller in size than a segment.

At Step 232, processing is executed for replacing addresses in each segment in accordance with the pseudo-random number sequence. The processing is equivalent to the processing of Step 94 of FIG. 6 in the first embodiment.

At Step 234, all the segments in which address replacement is completed are stored as an execution module of the program in a secondary storage device, for example.

Figure 18:
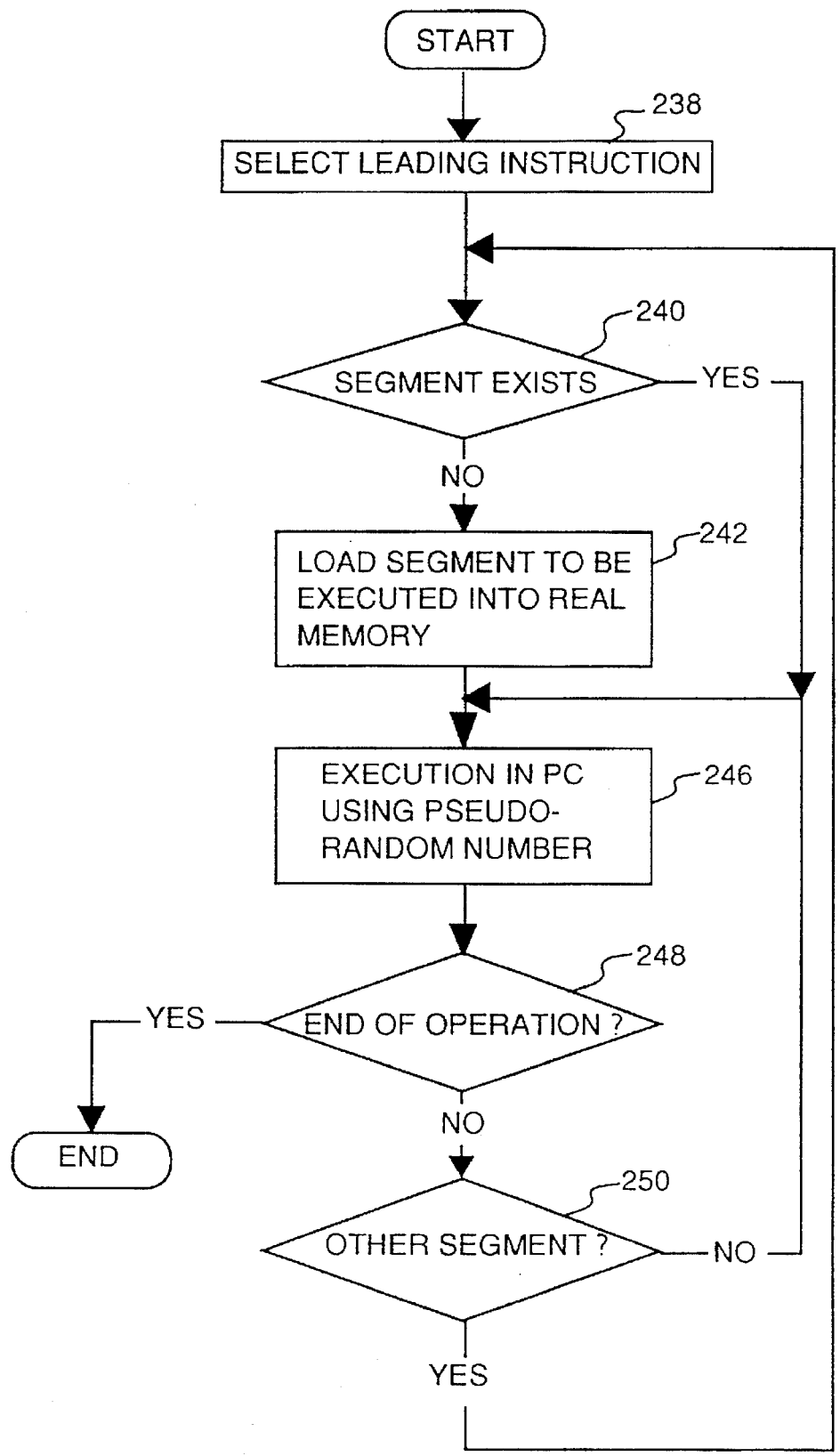
FIG. 18 is a flow chart of execution of the program in the second embodiment of the present invention.

FIG. 18 is a flow chart showing processing by the program execution control device of the present embodiment at the time of execution of the program made up of segments including instructions whose addresses are converted according to the processing shown in FIG. 17. With reference to FIG. 18, first at Step 238, a segment to be executed first and execution of a leading instruction of the segment are selected.

At Step 240, determination is made whether the segment exists in the instruction memory (real memory) or not. If it exists, the control proceeds to Step 246, and if not, goes to Step 242.

At Step 242, processing is conducted for loading the segment including the instruction to be executed into the real memory. The control then proceeds to Step 246.

At Step 246, processing is performed for executing one instruction in the segment in accordance with the pseudo-random number program counter. Execution of this processing determines whether a next instruction in the order of program addresses is to be executed or branch occurs. When the branch occurs, a jump address is also output.

At Step 248, determination is made based on the result of the execution of the instruction whether the entire operation of the device is to be finished or not. If the operation is to be continued, control goes to Step 250.

At Step 250, determination is made based on the result of the instruction executed at Step 246 whether an instruction to be executed next is included in other segment or not. If the instruction is not included in other segment, control returns to Step 246. If it is included in other segment, control returns to Step 240 to repeat processing of Step 240 and the following steps.

Repetitious execution of the operations of Steps 240 to 250 enables a pseudo-random number program counter to execute a large-scale program divided into a plurality of segments or a plurality of programs stored in different segments. In addition, because it is only necessary that only a segment required at present should exist in the instruction memory, the instruction memory can be utilized effectively. The use of the pseudo-random number program counter also produces an effect of higher-speed program execution than that realized by a conventional device using a program counter and an incrementer. While the program to be thus executed requires replacement of its addresses, the program can be executed repeatedly without further replacement of addresses once the replacement is done. Working efficiency, from production of a program to use of the same, therefore improves as a whole.

Although the foregoing embodiments have been described on the assumption that a main storage etc. is used as a real memory, the same is applied to accessing by using the pseudo-random number program counter for the read of instructions from an instruction cache provided in an LSI.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program execution control device comprising:

instruction storage means for storing instructions of a program at addresses sequentially designated in accordance with an M series pseudo-random number sequence in the order of program addresses of each instruction, instruction reading means having feedback shift register means for generating said M series pseudo-random number sequence for reading instructions from said instruction storage means by addressing based on generated pseudo-random numbers and instruction execution results; and decoding means for decoding a read instruction to output a control signal corresponding to the read instruction, while applying a select signal indicating whether a next pseudo-random number or a jump address determined by the read instruction is to be selected and a jump address to said reading means.

2. The program execution control device according to claim 1, wherein said feedback shift register means comprises:

a plurality of one-bit registers connectable to constitute one shift register; and a logic circuit for executing logic operation with respect to outputs of a predetermined number of one-bit registers out of said plurality of one-bit registers to feed back the result to a leading one-bit register of said shift register, wherein said feedback shift register further comprises selection means responsive to said select signal for selecting, as connection of said plurality of one-bit registers, either connection by which said plurality of one-bit registers constitute said shift register through said logic circuit or connection by which said plurality of one-bit registers are respectively applied corresponding bits of said jump address, and said plurality of one-bit registers generate said M series pseudo-random numbers when said selection means selects connection of said plurality of one-bit registers to constitute said shift register.

3. The program execution control device according to claim 2, wherein said selection means comprises a plurality of selectors provided corresponding to said plurality of one-bit registers for selecting either a bit applied from a preceding stage in a feedback shift path in said shift register or corresponding one bit of said jump address and applying the selected bit to said corresponding one-bit register in response to said select signal; and said logic circuit comprises a non-exclusive OR circuit for applying a non-exclusive OR of predetermined two outputs out of said plurality of one-bit registers to a selector corresponding to the leading one-bit register.

4. The program execution control device according to claim 2, wherein said feedback shift register means comprises seven of said one-bit registers;

said selection means comprises seven selectors provided corresponding to said seven one-bit registers for selecting either a bit applied from a preceding stage in the feedback shift path in said shift register or corresponding one bit of said jump address and applying the selected bit to said corresponding one-bit register in response to said select signal; and said logic circuit comprises a non-exclusive OR circuit for NON-EXCLUSIVE ORing outputs of two one-bit registers corresponding to bit 2 and bit 6 out of said seven one-bit registers to apply the non-exclusive OR to the selector corresponding to the leading one-bit register.

5. A program execution control device comprising:

program storage means for storing instructions of a program at addresses sequentially designated in accordance with an M series pseudo-random number sequence in the order of program addresses of each instruction, instruction reading means for generating pseudo-random numbers in accordance with said M series pseudo-random number sequence to read instructions from said program storage means, with generated pseudo-random numbers as addresses; and decoding means for decoding said read instruction to execute processing according to the read instruction.

6. A program execution control method comprising the steps of:

preparing an instruction memory in which instructions of a program are stored at addresses sequentially designated in accordance with an M series pseudo-random number sequence in the order of program addresses of each instruction;

generating pseudo-random numbers by feedback shift register means for generating pseudo-random numbers in accordance with said M series pseudo-random number sequence to read instructions from said instruction memory by addressing based on generated pseudo-random numbers and instruction execution results;.

decoding a read instruction to output a control signal corresponding to the read instruction to a program execution device, while outputting a select signal indicating whether an address designated by a next pseudo-random number or a jump address determined by the read instruction is to be selected and a jump address; and repeatedly executing said reading step and said outputting step until a predetermined condition is satisfied.

7. A program execution control method comprising the steps of:

dividing a program into a plurality of segments;

dividing an instruction memory into a plurality of segment storage regions;

modifying an arrangement of instructions such that instructions included in each of said plurality of segments are rearranged at positions sequentially designated in accordance with an M series pseudo-random number sequence in the order of program addresses;

specifying an instruction to be executed by a program execution device;

determining whether a segment including an instruction to be executed, out of said plurality of segments including instructions whose arrangement is modified, exists in the instruction memory and when the segment does not exist, loading the segment into a selected segment region out of said plurality of segment regions according to a predetermined condition to read said instruction to be executed from said instruction memory;

decoding a read instruction to output a control signal corresponding to the read instruction to the program execution device, while outputting a select signal indicating whether an address designated by a next pseudo-random number or a jump address determined by a decoding result is to be selected and a jump address;

generating pseudo-random numbers in accordance with said M series pseudo-random number sequence to specify an instruction to be read next based on the generated pseudo-random numbers, said select signal and said jump address; and repeatedly executing said reading step, said outputting step and said step of specifying an instruction to be read next until a predetermined condition is satisfied.

\* \* \* \* \*